United States Patent [19]

Kelch et al.

[11] Patent Number: 5,356,705
[45] Date of Patent: Oct. 18, 1994

[54] LAMINATED, WEATHERABLE FILM-CAPPED SIDING STRUCTURE

[75] Inventors: Robert H. Kelch; Steven E. Finlayson, both of Granville, Ohio

[73] Assignee: The Dow Chemical Company, Midland, Mich.

[21] Appl. No.: 819,198

[22] Filed: Jan. 9, 1992

[51] Int. Cl.⁵ .............................................. B32B 27/08
[52] U.S. Cl. .................................. 428/332; 428/518; 428/520; 428/517; 428/519; 156/244.11
[58] Field of Search ............... 428/518, 332, 520, 517, 428/519

[56] References Cited

U.S. PATENT DOCUMENTS

| | | |
|---|---|---|
| 3,284,277 | 11/1966 | Bonnaci et al. |
| 3,369,959 | 2/1968 | Noyes |
| 3,419,461 | 12/1968 | Gebbard, Jr. et al. |
| 3,435,096 | 3/1969 | Limbert et al. |
| 3,489,822 | 1/1970 | Witt et al. |
| 3,496,058 | 2/1970 | Schroter et al. |
| 3,616,130 | 10/1971 | Rogosch et al. |
| 4,100,325 | 7/1978 | Summers et al. |
| 4,169,180 | 9/1979 | McDonough |
| 4,183,777 | 1/1980 | Summers et al. |
| 4,438,171 | 3/1984 | Wefer |
| 4,440,825 | 4/1984 | Paddock |
| 4,444,840 | 4/1984 | Wefer |
| 4,444,841 | 4/1984 | Wheeler |
| 4,680,234 | 7/1987 | Kelch |
| 4,724,186 | 2/1988 | Kelch |
| 4,880,554 | 11/1989 | Newman et al. |

FOREIGN PATENT DOCUMENTS

418773A2  9/1990  European Pat. Off.

Primary Examiner—P. C. Sluby

[57] ABSTRACT

A laminated weatherable film-capped siding structure with improved dimensional stability and having a reduced incidence of oil canning. The structure comprises a polymeric structure and a weatherable film of uniform gauge having at least one weatherable layer consisting essentially of a weatherable styrene acrylonitrile copolymer impact-modified with olefinic elastomer or acrylic elastomer.

5 Claims, 1 Drawing Sheet

LAMINATED, WEATHERABLE FILM-CAPPED SIDING STRUCTURE

BACKGROUND OF THE INVENTION

This invention relates to weatherable structures and a process for preparing said structures. More particularly, this invention relates to laminated structures useful as materials for the building and construction industry. The weatherable structures of the present invention have reduced stress induced curl or surface distortion ("oil canning").

Currently, residential home vinyl siding having weatherable cap coatings are produced by coextrusion of a relatively thin weatherable cap layer over a thicker non-weatherable (and lower cost) substrate. For example, for light colors such as white or beiges weatherable poly(vinyl chloride) (PVC) is typically extruded over a non-weatherable PVC substrate. For darker colors, such as brown, red, blue, gray or green, PVC generally does not exhibit adequate weather stability, so alternate weatherable polymers such as AES (acrylonitrile-ethylene/propylene rubber-styrene) graft copolymers or ASA (acrylonitrile-styrene-acrylate rubber) graft copolymers are coextruded over the PVC substrate. U.S. Pat. No. 4,438,171, for example, discloses preparing a thick skeet laminate by coextruding a layer of an AES based on dicyclopentadiene (DCPD)-type EPDM onto a thermoplastic resin such as ABS (acrylonitrile-butadiene-styrene) or PVC.

In the preparation of weatherable structures by coextrusion, for example vinyl siding for the building and construction industry, there is a continual problem with the presence of "oil canning". "Oil canning" is warping, rippling or other surface distortion of a structure caused by unequal stress within the substrate imparted during extrusion.

Oil canning is prevalent in the coextrusion of AES and ASA-type polymers over PVC because AES-type polymers (such as ROVEL® brand weatherable polymers manufactured by The Dow Chemical Company) and ASA polymers (such as Geloy® and Centrex® weatherable polymers manufactured by GE and Monsanto, respectively) generally exhibit higher melt viscosities than the PVC and are typically processed at higher melt temperatures than PVC (temperatures which are high enough to thermally degrade PVC). As a result, coextrusion of a uniform AES or ASA cap coat is difficult to achieve.

A normal gauge thickness for a weatherable cap coat, such as AES, is typically desired to be at 5 mils. However, coextrusion of AES over PVC is difficult due to viscosity mismatch, and thus in preparing vinyl siding the siding product may be coextruded with a cap coat gauge ranging from 4 to 12 mils across the siding surface. Even though a 5 mils coating is typically the target, a nominal 8 mil (±4 mil) coating must be extruded in order to insure that at least 4 mils of cap covers the entire product. Not only does this significantly increase raw material costs, but the non-uniform cap coating imparts undesirable stresses upon the PVC substrate. These stresses are believed to cause the very undesirable "oil canning" which is curling or warping of the siding.

A study of the effects of polymer properties such as the coefficient of thermal expansion, heat distortion temperature, and flexural modulus (stiffness) upon the dimensional stability of exterior building products such as residential siding and window and door profiles is discussed by Elvira B. Rabinovitch in Journal of Vinyl Technology, Volume 10, No. 3, Mar. 1988, p. 14 et seq. The study showed that the coefficient of thermal expansion of a material (as well as the heat build-up due to solar radiation absorption of darker colors) was a primary factor affecting vinyl siding dimensional stability (oil-canning). Additionally, residual mechanical stresses within a siding structure due to material processing inconsistencies or non-uniformities are also a major factor dimensional instability.

Rubber modified styrenic polymers, such as AES and ASA, exhibit substantially different polymeric properties from those of exterior rigid PVC compounds. Typical key physical properties are shown in the following Table I:

TABLE I

COMPARISON OF KEY PHYSICAL PROPERTIES OF SIDING RESINS

| Property | Units | ASTM Test Method | AES[1] | ASA[2] | Exterior PVC Normal Impact[3] | Exterior PVC High Impact[3] |
|---|---|---|---|---|---|---|
| Specific Gravity | — | D792 | 1.02 | 1.06 | 1.45 | 1.42 |
| Flexural Modulus | psi (10⁵) | D790 | 3.0 | 2.4 | 4.3 | 4.1 |
|  | (MPa) (10³) | — | (2.07) | (1.69) | (3.0) | (2.83) |
| Heat Deflection | °F. | D648 | 210 | 190 | 160 | 162 |
| Temp. @ 264 psi | (°C.) | — | (99) | (88) | (71) | (72) |
| Coef. of Linear | in/in/°F.($10^{-5}$) | D696 | 4.4 | 5.9 | 3.6 | 3.5 |
| Thermal Expansion | (cm/cm/°C.) ($10^{-5}$) |  | — | (7.9) | (10.6) | (6.5) | (6.3) |

[1]AES = ROVEL ™ 501, trademark of The Dow Chemical Company
[2]ASA = GELOY ™ 1120, trademark of The General Electric Company
[3]PVC = GEON ™ PVC's, trademark of B. F. Goodrich Company The AES and ASA weatherable polymers exhibit substantially lower specific gravity and modulus (stiffness) and higher heat deflection temperature and coefficient of linear thermal expansion than rigid PVC.

As a result of these inherent property differences, multilayer structures produced by non-uniform coextrusion of dissimilar polymers, such as is frequently experienced with AES or ASA coextruded over rigid PVC, can result in significant incorporation of stress within the extruded structure. These gauge related internal stresses coupled with temperature induced differential thermal stresses (particularly within a complex profile shaped structure) can result in siding surface distortion or oil-canning.

Oil canning can be seen during production and most notably in the field during siding installation or on the house once installed. It is estimated that as much as 20% of siding produced by coextrusion of dissimilar resins exhibits oil canning in a typical plant and must be scrapped (or recycled). Additionally, oil canning of siding product produced from coextrusion of dissimilar polymers is the predominant reason for customer complaint and product return.

Another disadvantage of a coextrusion process is that such a process requires expensive capital investment (second extruder, second resin feed system, coextrusion die), and as with any extrusion, color changes requires significant polymer purging, which increases overall production costs.

Another method of preparing multilayered structures is to laminate a cap coating or layer in the form of a previously prepared film onto a separately formed substrate layer. Some lamination processes have the disadvantage of requiring the use of an adhesive layer between the weatherable film and substrate for adhering the film layer onto the substrate because the film layer may be difficult to adhere to a substrate without an adhesive. For example, U.S. Pat. Nos. 4,680,234 and 4,724,186 disclose a multilayered laminated structure employing an adhesive layer to bond a film to a substrate.

Difficulty occurs when laminating weatherable polymers such as films produced from acrylics (Korad TM polymers manufactured by Polymer Extruded Products), or fluoropolymers (Kynar TM and Tedlar TM polymers manufactured by Atochem and E. I. du Pont de Neumours, respectively) which are incompatible or immiscible with a PVC substrate. Thus, an adhesive must be used to bond these types of polymer layers to PVC. Additionally. these incompatible polymers also present difficulties with in-plant recycle and re-extrusion of recycle-containing substrate layers and can result in structures with inferior physical properties.

Various patents disclose laminating an AES-type film onto various substrates other than PVC siding. For example, U.S. Pat. No. 4,444,841 describes laminating an extruded AES film onto a metallic or cellulosic (i.e. wood) base material; U.S. Pat. No. 4,444,840 describes laminating a calendered AES film onto an ABS substrate and U.S. Pat. No. 4,440,825 describes laminating a sheet of an AES graft copolymer composition layer onto a sheet layer of foamed ABS or foamed PVC to form a sheet product.

Still there are other patents, for example, U.S. Pat. Nos. 4,169,180; 4,183,777 and 4,100,325, which disclose preparing a laminate useful as a construction material such as residential siding comprising a cross linked acrylic or plasticized PVC protective layer on a PVC or other rigid (such as ABS) substrate. However, these patents do not address the problem of oil canning.

It is therefore desired to provide a process for preparing a laminate structure by laminating a cap coating or outer layer onto a vinyl substrate without the need for adhesive layers and wherein said laminates exhibit reduced oil canning as compared to corresponding structures prepared by coextrusion processes.

SUMMARY OF THE INVENTION

The present invention is directed to a process for producing a weatherable polymeric siding with substantially reduced stress induced curl or "oil canning".

In accordance with the present invention, a thin weatherable film, produced from a weatherable polymer, for example, such as AES or ASA or blends thereof is thermally on-line laminated without the need or use of an adhesive, to poly(vinyl chloride) (PVC) siding during the extrusion of the vinyl siding substrate. The resulting weatherable film capped vinyl laminate exhibits substantially reduced surface distortion, curl or "oil canning" over the length of a siding section (typically 12 to 16 feet) than conventional coextruded dissimilar weatherable polymer capped product.

Reduced oil canning results in a higher quality product with reduced off-grade and better first pass production yields. Rapid color changes can also be achieved via film lamination (simply by switching rolls of film) versus conventional coextrusion (which requires extensive extruder purging to switch colors), which further increases production yields and efficiency; resulting in reduced costs. Furthermore, film color and gloss can be pre-tested and approved prior to laminating to the siding extrudate. The uniform weatherable film cap coating furthermore results in uniform weathering and color change, avoiding light/dark variation areas which can be caused by resin thickness variation.

The utilization of a uniform gauge weatherable film as a thermal lamination coating onto the non-weatherable PVC substrate has been seen to reduce oil canning (and thus reduce the amount of off-grade product). Use of a uniform gauge 5 mil AES filmy for example, which has been pre-inspected for gauge, color, gloss, and potential defects, has been shown to alleviate many of the problems of coextrusion. A uniform gauge film will not impart varying surface stresses as does a coextruded non-uniform 4 to 12 mil cap coating.

The film of the present invention can be produced using conventional film fabricating techniques. Minor capital investment for a film roll unwind stand and lamination roll allows the weatherable cap to be installed on a conventional monolayer vinyl extrusion line (versus very expensive coextrusion capital requirements). Other advantages realized by employing the present invention include, for example: colors can be rapidly changed by simply changing the cap film roll (versus long extruder color purge times); production efficiency (and resulting capacity) can be significantly increased; and, as the film coated vinyl siding weathers, the color change is uniform because of the uniform coating thickness. Experience has shown that coextrusion thickness variations, especially when the thickness is low (2 to 4 mils), do lead to color variation on the siding with dark/light areas visibly evident. With the uniform film thickness obtained in the present invention, any color change will be uniform.

DETAILED DESCRIPTION OF THE PREFERRED EMBODIMENTS

Figure 1:
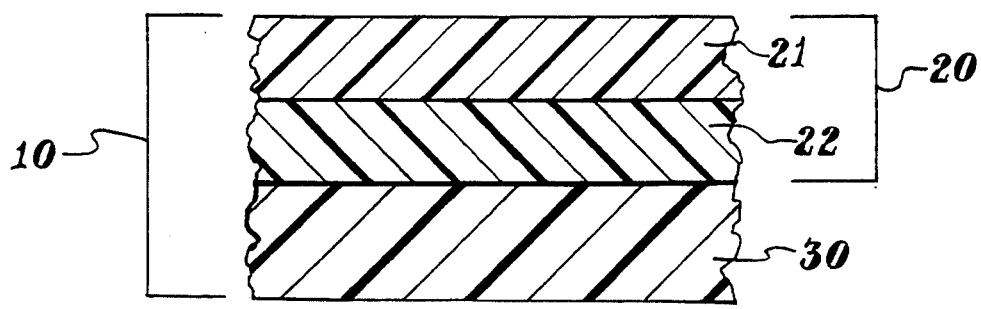
FIG. 1 is an enlarged, partial cross-sectional view of one embodiment of the present invention showing a weatherable film adhered to a substrate.

Referring to FIG. 1, a multilayer flexible weather resistant structure 10 is shown comprising a weather resistant outer film layer 20 and a substrate 30. The weatherable film 20 can be multilayer or single layer and the substrate 30 can also be multilayer or single layer.

In general, the weatherable film of the present invention can be laminated to one or both sides of another weatherable thermoplastic substrate, a less weatherable thermoplastic substrate or a non-weatherable thermoplastic substrate. In this instance, a less-weatherable substrate such as PVC is employed. The weatherable laminated film of the present invention serves as a screen to protect the less weatherable substrate from the harmful effects of sunlight.

The weatherable film 20 can be a monolayer or a multilayer, for example as shown in FIG. 1. For economical reasons and production of less waste, film 20 is preferably made up of weatherable layer 21 and recycle-containing layer 22.

The weatherable layer 21 can be made of a virgin material of rubber modified styrene polymers or copolymers such as ABS, ASA, AES, other olefinic styrene acrylonitrile (OSA) polymers or copolymers and mixtures thereof; PVC or ASA-PVC blends; styrene acrylonitrile copolymer (SAN); or blends of any of the above; and blends with other materials such as chlorinated polyethylene (CPE), acrylics, olefins and the like. The layer 21 is preferably a styrene acrylonitrile copolymer that is impact modified with olefinic elastomer or acrylic elastomer. Preferred weatherable polymer materials for use herein include ethylene propylene (EP) or ethylene propylene non-conjugated diene (EPDM) rubber-modified sytrene/acrylonitrile modified copolymers (AES), acrylate rubber-modified styrene/acrylonitrile copolymers (ASA) or mixtures thereof. More preferably, layer 21 is an AES graft copolymer-containing layer i.e. a layer containing a graft copolymer of resin-forming monomers on an EPM or EPDM type rubber spine. Layer 21 may contain additional additives or ingredients such as colorants, UV and thermal stabilizers, fillers, antioxidants, processing aids, lubricants, impact modifiers, pigments and the like.

Layer 22 can be made of any of the virgin materials described above with reference to layer 21, recycle material and/or other non-weatherable/less weatherable materials or mixtures thereof. The following materials may also be possible additives to layer 22: colorants, UV and thermal stabilizers, fillers, antioxidants, compatibilizers, lubricants, processing aids, impact modifiers, pigments and the like. Layer 22 may contain limited amounts of recycled/reused film or recycle from reground siding. The recycle content of layer 22 will typically be from 0 percent to about 80 percent of the total layer composition, preferably from about 20 percent to about 50 percent.

Suitably, the total layer thickness or gauge of the film 20 is from about 2 to about 10 mils, preferably from about 4 to about 6 mils; with the gauge of layer 21 preferably being from about 2 to about 3 mils and the gauge of layer 22 preferably being from about 2 to about 3 mils.

The film should be of "uniform gauge". By "uniform" it is meant that the resulting film should not have a deviation in thickness of more than about ±20 percent and preferably not more than about ±10 percent of the nominal film gauge.

The substrate layer 30 can also be monolayer or multilayer. The substrate materials useful in the present invention can be any polymeric material that the layer 20 can be permanently, thermally laminated and adhered thereto.

The thickness of the substrate 30 is generally from about 10 to about 100 mils and preferably from about 20 to about 40 mils. Preferably, the substrate 30 is a PVC substrate such as a rigid (non-plasticized) PVC substrate with or without additives such as impact modifiers (such as CPE, acrylic, styrenic block copolymers); processing aids; thermal and oxidative stabilizers; UV stabilizers; fillers (such as talc, $TiO_2$, calcium carbonate); pigments and recycle.

The film 20 is easily bonded to the surface of a substrate employing presently available thermal lamination equipment. The lamination process in general is well known and involves a process whereby two or more products are formed separately and then later adhered together such that the two separately formed products form one product. The preferred method of lamination is to extrude the substrate and thereafter laminate the capstock onto the substrate by pressing the capstock and substrate together between two rolls while the substrate is still hot. The capstock resin must be compatible with the substrate resin or the products of these resins will not adhere to each other unless an adhesive is employed. A suitable lamination apparatus is more particularly described by reference to FIG. 2.

Figure 2:
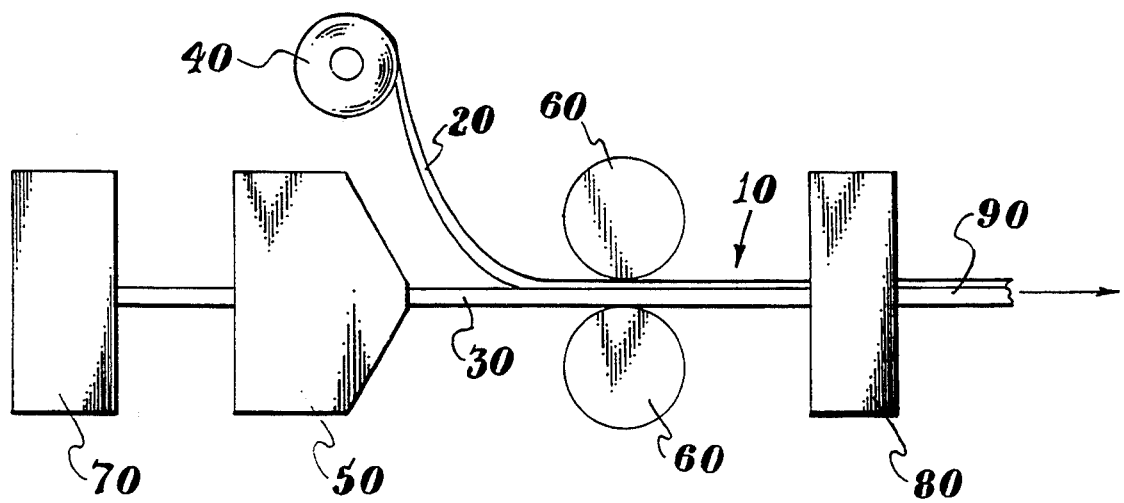
FIG. 2 shows a schematic diagram of the lamination process of the present invention.

With reference to FIG. 2, there is shown a lamination apparatus and a film roll unwind 40 for supplying the laminated weatherable film 20. The laminated weatherable film 20 is contacted with a heated substrate 30 exiting an extrusion die 50 and both materials are passed between lamination nip rolls 60 where the heated substrate 30 is obtained from a substrate supply 70. Heating of the substrate 30 may be occasioned by use of heating means (not shown) which may be an oven, induction heater, hot rollers or other heating means. The temperature of the nip rolls 60 is preferably from about 100° F. to about 200° F. The nip roll pressure is sufficient to bring the two layers (20 and 30) in intimate contact with each other and exclude air from the interface of the film 20 and substrate 30. The lamination temperature of the substrate 30 at the point of lamination is generally from about 300° F. to about 450° F., preferably from about 350° F. to about 400° F.

After lamination to the substrate 30, the resulting laminate 10 is post-treated as shown generally at area 80 to form a siding product 90 which includes conventional vinyl siding fabrication steps of forming the laminate into a siding shape, quenching the shaped product, punching out the notches for the overlapping portions of the siding and cutting the shaped product to the desired length.

The laminates of the present invention are particularly useful for making thermally formed or shaped articles of various kinds, more particularly siding for building and construction. The purpose of the outer skin layer is to provide an aesthetically pleasing appearance while protecting the substrate from adverse effects of exposure to the weather, and especially sunlight. The industry's need for an entirely satisfactory, economical skin layer material that has a desirable hardness and that is reprocessable (so that scrap material or off-grade products can be recycled readily) is satisfied by the present invention.

The present invention is illustrated further by the following Examples, but the Examples should not be construed as limiting the scope of the present invention.

EXAMPLE 1

A laminated structure was prepared in this Example to test the structure's properties and to observe the extent of oil canning of said laminated structure. Various tests were carried out according to the indicated test methods which follow herein below.

First, a 5.0 mil (±0.5 mil) film of a weatherable polymer blend was produced on a conventional cast film process at a melt temperature of 450° F. The polymer blend employed was a blend of AES and ASA resins and contained on a total weight basis a combined total of 26 percent rubber with 19 percent being EPDM rubber and 7 percent being butylacrylate rubber. The resin blend also contained pigment added through an AES color concentrate. The film was extruded at extruder temperatures of 400° F. to 430° F. (204° C. to 222° C.) and die temperature of 430° F. (222° C.). The film was extruded onto a cast roll at 150° F. (66° C.) and then further cooled by a chill roll at 120° F. (49° C.). The resulting weatherable film produced above was then wound on rolls.

On a separate sheet extrusion line a rigid PVC extrudate was prepared through an extrusion die at about 400° F. (204° C.).

A laminated structure was prepared by unwinding the roll of weatherable film onto the PVC siding extrusion line with the film being nipped onto the hot (400° F. (204° C.)) PVC extrudate shortly after leaving the die. A PVC "wood grain" embossing roll was used to laminate or press room temperature ((80° F.)(27° C.) film onto the hot PVC. The contacting surface of the film was melted by and fused onto the PVC.

The resulting hot laminate then passed through a conventional siding forming die, water cooling bath, and cutter assemblies to produce a siding product comprising a composite structure of a weatherable film and PVC substrate. The weather resistant AES-ASA film could not be delaminated from the resulting composite (i.e. The adherence of the film exceeded the strength of the film itself). Oil canning or surface distoration of the 16-foot film-capped siding segments was not observed in any of the laminate produced when evaluated at room temperature (75° F.) or at elevated temperatures (160° F.).

Physical property testing, described below, of the AES-ASA film/PVC substrate siding showed physical properties which were equal to or better than standard coextruded ASA/PVC product or PVC siding.

The following sample materials were tested:

| Sample Material | Sample Designation |
| --- | --- |
| AES-ASA Film laminate onto PVC siding | A |
| ASA/PVC Coextruded Siding | B* |
| PVC Siding | C* |

*Not an example of the present invention

1. Dimensional Change of Siding Samples

Siding samples (3 inches (7.62 centimeters) square) were exposed to 300° F. (149° C.) in an oven for 1 hour and then allowed to cool down to room temperature (25° C.). Then, the "% dimensional change" in Machine Direction (MD) and Transverse Direction (TD) of the samples was measured at room temperature. The results were as follows:

| | % Dimension Change | |
| --- | --- | --- |
| Sample | MD | TD |
| A | −6 | +4 |
| B* | −10 | +2 |
| C* | −14 | +7 |

The results show that film laminate (Sample A) exhibited lower dimensional change, as desired, than comparative samples B or C.

2. −40° F. Curl of Siding

Standard "double five width" (about 11.5 inches wide) siding samples of 1 foot length with one end attached to a horizontal test structure leaving one end free to move were exposed to a temperature of −40° F. (−40° C.) and the amount of curl of each sample from horizontal was measured in inches. The results were as follows:

| Sample | Curl |
| --- | --- |
| A | 0.5 inches |
| | (1.3 Centimeter) |
| B* | 3.0 inches |
| | (7.6 Centimeter) |
| C* | 0 inches |
| | (0 Centimeter) |

The results show that the AES-ASA film laminate (Sample A) exhibited significantly lower curl than the ASA coextruded siding (Sample B), although the AES-ASA film laminate did have more curl than straight PVC siding (Sample C).

3. Toughness/Impact Strength

Instrumented impact strength was measured according to ASTM D-3763 on 2 inch square samples cut from the siding product prepared as described above. Test conditions included a 0.5 inch (1.3 cm) dart, 1.5 inch (3.8 cm) support, and an impact speed of 8000 inches/minute (203.2 m/minute). The total impact strength of the samples were as follows:

| Sample | Impact Strength |
| --- | --- |
| A | 2.6 inch-lb/mil (11.6 J/mm) |
| B* | 2.5 inch-lb/mil (11.1 J/mm) |
| C* | 2.5 inch-lb/mil (11.1 J/mm) |

The results show that all samples had comparable impact strength.

4. Thermal Cycling for Delamination

Siding samples were cycled from −40° F. to 160° F. (40° C. to 71° C.) on a 24 hour cycle for 3 weeks. The possibility of cap coating delamination from PVC substrate was periodically checked. The results were as follows:

| Sample | Cap Delamination |
| --- | --- |
| A | Pass - No Delamination |
| B* | Pass - No Delamination |
| C* | Pass - No Delamination |

The results show that all samples passed the cycling delamination test (no delamination of film or coextruded cap layer).

5. Water Submersion Delamination

Samples (3 inch square) were submerged in water for 3 hours at 180° F. (82° C.). The cap coat (film or coextruded layer) was checked for possible delamination. The results were as follows:

| Sample | Cap Delamination |
| --- | --- |
| A | Pass - No Delamination |
| B* | Pass - No Delamination |

The results show that no sample delaminated after hot water was used.

EXAMPLE 2

A 5.0 mil (±0.5 mil) AES film was produced on a conventional cast film process according to the method described in Example 1. The film was produced from an AES resin containing SAN-grafted EPDM rubber particles dispersed in a continuous SAN copolymer matrix and having an EPDM rubber content of 22 weight percent. The AES resin also contained pigment added through an AES color concentrate. The film produced was laminated onto hot PVC extrudate produced by a conventional vinyl siding extrusion line, as described in Example 1. The AES film was inseparably fused onto the PVC and shaped into the appropriate vinyl siding profile structure.

The AES film laminate siding was found to exhibit no oil canning as seen at room temperature and at elevated temperatures on a test table following production. By comparison, AES resin and ASA resin which were separately coextruded onto PVC substrates using a similar PVC coextrusion process line were found to exhibit 5-20% off-grade product due to oil canning during extended production campaigns.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A laminated weatherable film-capped siding structure with improved dimensional stability and having a reduced incidence of oil canning comprising
   (a) a polymeric substrate; and
   (b) a weatherable film extruded separately from said polymeric substrate and thermally laminated to said polymeric substrate, said weatherable film having at least one weatherable layer consisting essentially of a weatherable styrene acrylonitrile copolymer impact-modified with olefinic elastomer or acrylic elastomer, and said weatherable film having a uniform gauge.

2. The structure of claim 1 wherein said weatherable film is compatible with the polymeric substrate.

3. The structure of claim 1 wherein said polymeric substrate consists essentially of poly(vinyl chloride).

4. The structure of claim 1 wherein the thickness of said weatherable film is from about 2 mils to about 10 mils.

5. The structure of claim 1 wherein said polymeric substrate consists essentially of an impact modified polystyrene or acrylonitrile-butadiene-styrene copolymer.

* * * * *